United States Patent [19]
Borskey

[11] 3,730,196
[45] May 1, 1973

[54] STORABLE VEHICLE CANOPY

[76] Inventor: Charles L. Borskey, P.O Box 26, Andrews, Ind. 46702

[22] Filed: July 16, 1971

[21] Appl. No.: 163,278

[52] U.S. Cl. ................. 135/5 A, 135/7.1 A, 160/22
[51] Int. Cl. ............................................. E04f 10/06
[58] Field of Search .................. 135/4 A, 5 A, 7.1 A; 160/19, 22, 377

[56] References Cited

UNITED STATES PATENTS

| 1,483,741 | 2/1924 | Moffett | 135/4 A |
| 2,806,478 | 9/1957 | Sherbinin | 135/5 A |
| 3,018,783 | 1/1962 | Tyson | 135/5 A |
| 3,364,973 | 1/1968 | Railson | 160/26 X |

Primary Examiner—J. Karl Bell
Attorney—Wilson & Fraser

[57] ABSTRACT

A canopy structure for a vehicle which is readily storable on the vehicle and may be readily removed from its stored position to a position of use.

6 Claims, 5 Drawing Figures

Patented May 1, 1973

3,730,196

INVENTOR.
CHARLES L. BORSKEY
BY
Wilson & Fraser
ATTORNEYS

STORABLE VEHICLE CANOPY

DESCRIPTION OF THE PRIOR ART

In recent years, small buses and vans and similar vehicles have been extensively used, often by families and small groups, in travelling from one part of the country to another, using the vehicles for living quarters at night and during stop-overs at vacation and recreation places. The enjoyment of the small buses and vans is often enhanced by the addition of an awning or canopy which can be installed to extend from an outside portion of the vehicle to provide additional sheltered space for the inhabitants of the vehicles.

Since the awning and canopy structures are generally not incorporated as an integral part of the vehicle by the vehicle manufacture, these structures must be installed by the user. Previous attempts to produce such structures have resulted in designs that were expensive and rather difficult to install and erect.

SUMMARY OF THE INVENTION

It is one of the principle objects of the present invention to provide an awning or canopy structure for a vehicle which can be readily installed on recreational type vehicles and can be easily moved from the stored position to an erected position with minimal effort.

Another object of the invention is to produce an awning or canopy structure which may readily be stored while the vehicle is in transit.

Another object of the invention is to produce an awning or canopy having a simplified supporting structure.

A further object of the invention is to produce an awning or canopy which is particularly compact upon storage.

Another object of the invention is to produce an awning or canopy structure which is integral with the vehicle with which its use is associated.

BRIEF DESCRIPTION OF THE DRAWINGS

The above objects and advantages of the invention will become readily apparent to one skilled in the art from reading the following detailed description of an embodiment of the invention when considered in the light of the accompanying drawings, in which.

DESCRIPTION OF THE PREFERRED EMBODIMENT

Figure 1:
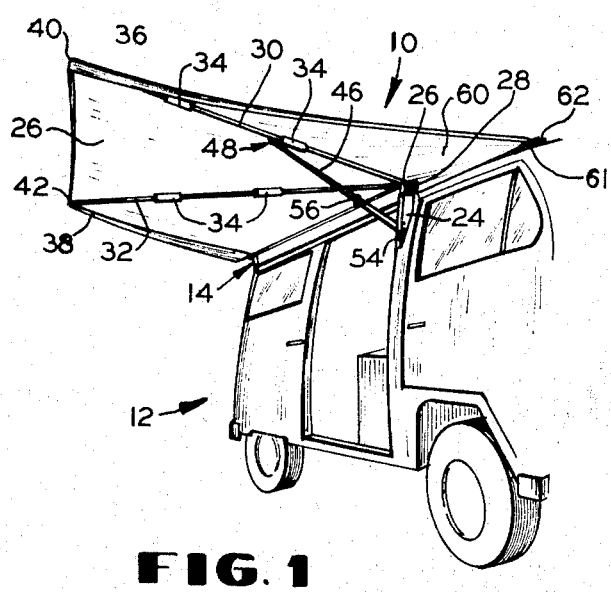
FIG. 1 is a fragmentary perspective view of a vehicle having an awning or canopy structure mode in accordance with the present invention.

Referring to the drawings, there is shown in FIG. 1 an awning or canopy structure 10 affixed to the side of a vehicle 12 and adapted to extend outwardly from a stored position to an open position to provide overhead shelter and shade thereby actually extending the useful limits of the living area of the vehicle.

Figure 2:
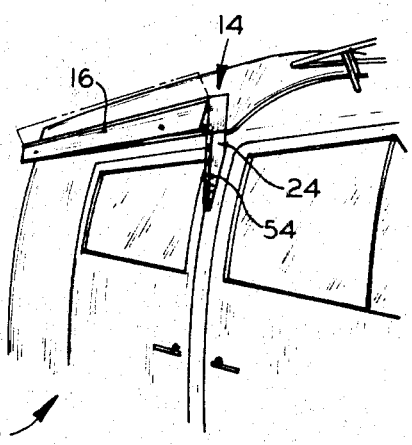
FIG. 2 is a view of the apparatus illustrated in FIG. 1 showing the awning in a folded or stored condition.
Figure 5:
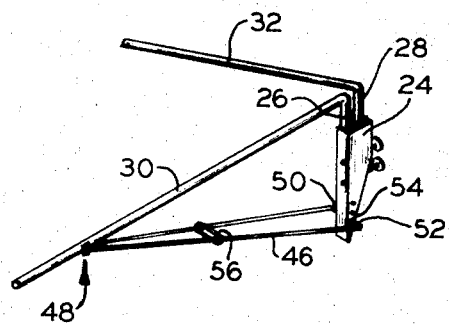
FIG. 5 is an enlarged fragmentary perspective view of the support brace of FIG. 1.
Figure 3:
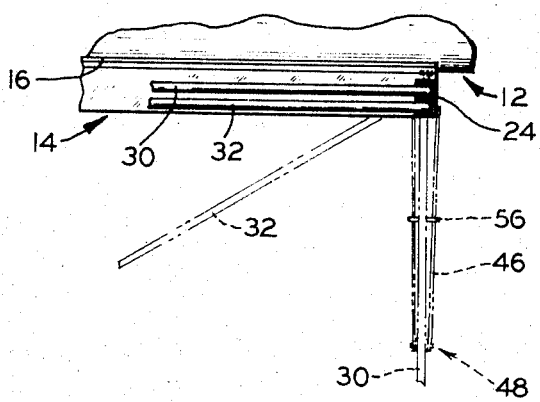
FIG. 3 is a fragmentary top view of the supporting structure for the awning of the invention.
Figure 4:
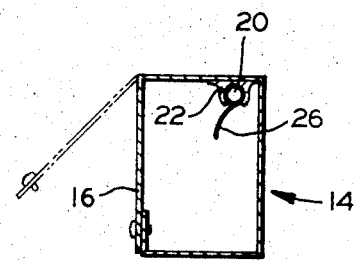
FIG. 4 is an enlarged sectional view of the apparatus taken along line 4—4 of FIG. 3.

The awning or canopy 10, in its stored condition, is contained within a container 14 having an associated cover 16, as clearly illustrated in FIGS. 2 and 4. The awning or canopy 10 is formed of flexible sheet material 18 typically canvas or the like. The edge portion of the sheet material 18, adjacent the vehicle is provided with a bead or welding 20 along the entire length of the edge of sheet material. The bead or welting 20 is secured within the container 14 by being disposed within an elongate channel member 22. It will be appreciated that the bead of welting 20 of the sheet material 18 is typically manually inserted into the elongate channel member 22 during the installation of the sheet material 18 to the container 14.

Adjacent the forward end of the container 14, there is an awning or canopy supporting bracket 24 which is typically secured to the vehicle 12 by means of carriage bolts, for example, not illustrated. The supporting bracket 24 may be formed of a number of different materials; however, it has been found that aluminum has many of the desired characteristics. The supporting bracket 24 is provided with vertically extending sockets for pivotally receiving the downwardly extending end portions 26, 28 of the main supporting rods 30, 32, respectively. The sheet material 18 is secured to the rods 30 and 32 by a series of sleeves 34 which are typically formed of the same material as the sheet material 18. The sleeves 34 are stitched or otherwise suitably secured to the sheet material 18. During the assembly of the structure, the rods 30 and 32 are inserted into the sleeves 34 to thereby attach the sheet material 18 to the rods 30 and 32.

The ends 36, 38 of the rods 30, 32 respectively are adapted to be contained within the corner sections 40, 42 respectively of the sheet material 18. It will be appreciated that the ends 36 and 38 of the rods 30 and 32 can effectively retain and support the corner sections 40 and 42 by merely forming a box-like configuration of the sheet material as illustrated in the drawing; or alternatively, actual pockets could be sewn to the underside of the sheet material 18 in the regions of the corner sections 40 and 42 to receive and retain the ends 36 and 38 of the rods.

Additional support is provided for the rod 30 by a brace 46 which has been bent upon itself in the form of a "V". The apex of the "V" is pivotally mounted to the rod 30 by a bracket 48. The terminal ends 50 and 52 of the brace 46 are bent inwardly toward each other and are adapted to be received selectively within a series of vertically spaced apart pairs of holes 54 formed in the supporting bracket 24. The ends 50 and 52 of the linkage 46 are maintained within the selected pairs of holes 54 by a chain link 56 which when moved in a direction toward the supporting bracket 24 will tend to force the ends 50 and 52 into the associated holes 54 and thereby lock the brace 46 in place. The linkage 46 provides additional support for the rod 30 which supports the sheet material 18 forming the awning or canopy 10.

The sheet material 18 is formed to have a forwardly extending wing-like section 60, the free end of which is provided with a strap 61 which is secured to a tie down bracket 62 fastened to the forward portion of the roof of the vehicle 12.

When it is desired to collapse the awning 10 and dispose the same in the container 14, the chain link member 56 is moved in a direction toward the bracket 48 thereby permitting the ends 50 and 52 and of the brace 46 to be removed from the holes 54 of the supporting bracket 24. Next, the strap 61 of the wing-like section 60 is unfastened from the tie down bracket 62, and the entire awning assembly is ready to be collapsed and disposed within the container 14. More specifically, the sheet material 18 is moved toward the container 14 thereby causing the supporting rods 30 and 32 to swing about their respective ends 26 and 28 which are pivotally disposed in the supporting bracket 24. When the entire assembly, including the sheet material 18, the supporting rods 30 and 32, and the brace 46, is adjacent the open portion of the container 14, it is stored therewithin. Finally, the cover 16 is closed and is maintained in such position by any well known fastening means such as, for example, snaps.

It will be appreciated that the above described structure produces a relatively inexpensive awning or canopy assembly for a vehicle, which may be incorporated onto the vehicle at the point of manufacture, or may be added to an existing vehicle after manufacture. The resultant structure is one which may be readily extended from its stored position to an operative position easily and quickly, only requiring a single person. Further, it has been found that the cantilever type supporting structure for the sheet material of the awning or canopy results in an extremely sturdy support of relatively minimal weight.

In accordance with the provisions of the patent statutes, I have explained the principles and mode of operation of my invention, and have illustrated and described what I now consider to represent its best embodiment. However, I desire to have it understood that, within the scope of the appended claims, the invention may be practiced otherwise than as specifically illustrated and described.

What I claim is:

1. A storable canopy for a vehicle comprising:
   a cantilevered support frame;
   means for pivotally securing said support frame to the vehicle including a bracket secured to the vehicle having socket means enabling said support frame to swing about a vertical axis;
   flexible sheet material secured to said support frame; and
   means for containing said support frame and said sheet material, said containing means being attached to the vehicle.

2. The invention defined in claim 1 wherein said cantilevered support frame includes at least one rod member, having a depending end portion received within said socket means of said bracket.

3. The invention defined in claim 2 including a brace member connected between said rod member and said bracket providing additional strength to said support frame.

4. The invention defined in claim 3 wherein said brace member is an elongate linkage having one end portion pivotally connected to said rod member and the other end portion connected to said bracket.

5. The invention defined in claim 4 wherein said bracket includes a plurality of spaced holes therein.

6. The invention defined in claim 5 wherein the other end portion of said linkage of said brace member contains inwardly extending terminal portions engagable within the respective ones of the spaced holes in said bracket.

* * * * *